March 8, 1966     J. MAKSIM, JR     3,238,894

DUO-RAIL TRANSPORTATION SYSTEM

Filed April 10, 1961     4 Sheets-Sheet 1

INVENTOR.
JOHN MAKSIM, JR.
BY
Christie Parker & Hale
ATTORNEYS.

March 8, 1966  J. MAKSIM, JR  3,238,894
DUO-RAIL TRANSPORTATION SYSTEM
Filed April 10, 1961  4 Sheets-Sheet 2

INVENTOR.
JOHN MAKSIM, JR.
BY
Christie, Parker & Hale
ATTORNEYS

March 8, 1966        J. MAKSIM, JR        3,238,894

DUO-RAIL TRANSPORTATION SYSTEM

Filed April 10, 1961        4 Sheets-Sheet 3

INVENTOR.
JOHN MAKSIM, JR.
BY
Christie Parker & Hale
ATTORNEYS

United States Patent Office

3,238,894
Patented Mar. 8, 1966

3,238,894
DUO-RAIL TRANSPORTATION SYSTEM
John Maksim, Jr., 8165 Cornwall, Etiwanda, Calif.
Filed Apr. 10, 1961, Ser. No. 101,941
19 Claims. (Cl. 104—121)

This invention relates to transportation systems, and, more particularly, to a high speed mass transportation system having a unique track guidance arrangement.

Recently there has been developed transportation systems known generically as monorail systems. While monorail systems have many advantages over conventional surface transportation systems, particularly over railroads, monorails are bound mechanically to their supporting rails by rotatable wheels and thus suffer from certain disadvantages or limitations because of these mechanical supporting means. In turns at high speeds high centrifugal forces are imparted to the supporting wheels and also to the occupants of the monorail vehicle in a manner which is not entirely compensated for by adjustment of the vehicle's orientation to the ground. Also, any transportation system having a passenger or cargo carrying vehicle which has a mechanical linkage with a supporting structure has inherent characteristics of a rough and noisy ride. Further, mechanical supporting linkages for transportation systems have inherent upper limits of speed which are lower than in systems which are not bound mechanically to the ground or surface over which they travel.

This invention provides a transportation system capable of high speeds and provides a smooth and quiet ride without mechanical linkage to supporting structure when the vehicle of the system is operating at its normal speed. The aerodynamic lubrication principle utilized in this invention provides a transportation system which can use existing railroad right-of-ways for urban and cross-country travel and further provides vehicles which are self-stabilizing in turns and which includes means for compensating for the unpleasant effects of centrifugal force on humans while the vehicle turns at high speeds.

Generally speaking, this invention comprises a vehicle which includes a means for propelling the vehicle. Stationary air-bearing surfaces are provided on vehicle guidance means disposed longitudinally of the vehicle on opposite sides of the vehicle. The vehicle includes a plurality of air-bearing surfaces affixed thereto. The vehicle is supported on wedge-shaped films of air compressed between the stationary and the vehicle-mounted surfaces.

The following detailed description and explanation of this invention is made in conjunction with the following figures, wherein.

Figure 1:
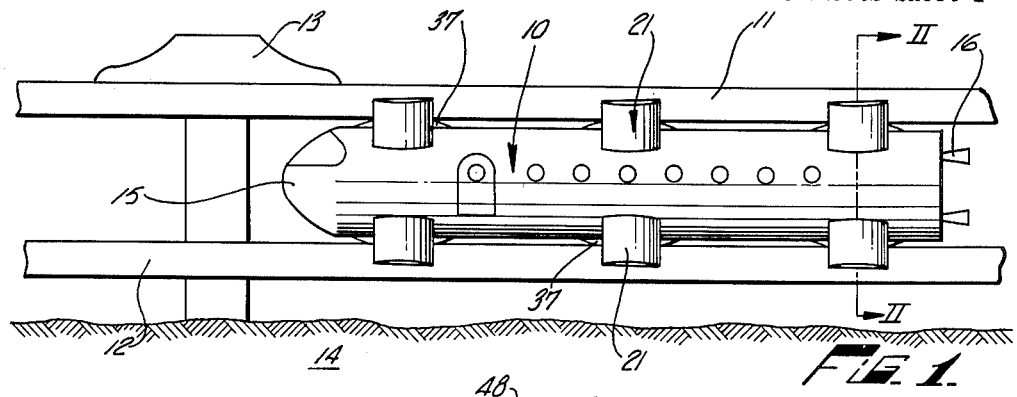
FIGURE 1 is a side elevational view of this invention showing a vehicle of the system traveling between the supporting air-bearing surfaces.

Referring to FIGURE 1, a vehicle or car 10 of the system of this invention is shown suspended between oppositely disposed horizontal support members 11 and 12 cantilevered on pedestals 13 mounted in the ground 14. The car 10 is preferably of cylindrical configuration having an aerodynamically streamlined outline with a pilot or engineer's compartment 15 at the forward end and propulsion means 16 included within the vehicle 10. Since this transportation system derives advantage from the car 10 being free of mechanical contact with the support members 11 and 12, the propulsion means of the vehicles 10 of the system preferably should be of the type, such as reaction engines or propellers, which are not dependent on frictional contact with a surface adjacent the vehicle 10.

Figure 2:
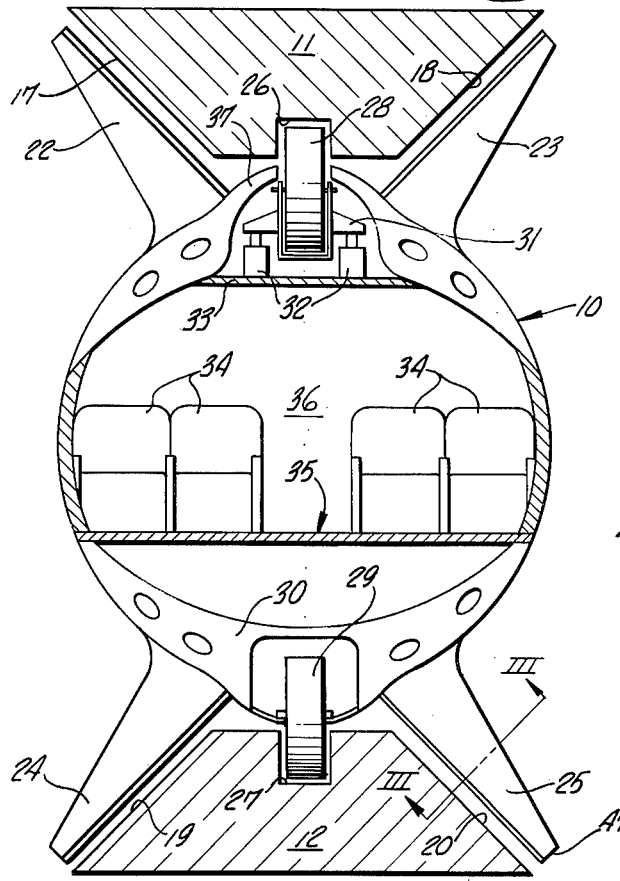
FIGURE 2 is an enlarged cross-sectional view of the car or vehicle of this invention taken along line 2—2 of FIGURE 1.

Air-bearing surfaces 17 to 20 are provided along opposite converging sides of the support members 11 and 12 shown in cross-section in FIGURE 2. Preferably these surfaces 17 and 18 on support member 11 and 19 and 20 on support member 12 are planar and have relatively smooth surfaces. A plurality of fins, shown generically by character 21 and identified more specifically as 22 through 25 (FIG. 2) corresponding to surfaces 17 to 20 in FIGURE 2 are mounted longitudinally and substantially radially of the car 10 and are located such that they are located closely adjacent the stationary support surfaces 17 to 20.

A longitudinal groove or recess 26 and 27 is provided in supports 11 and 12, respectively, adjacent the converging surfaces 17 and 18, and 19 and 20, respectively. Wheels 28 and 29 are mounted on car 10 to engage the recesses 26 and 27, respectively, at low speeds. The wheel 27 is mounted rigidly to the bottom structure 30 of the car 10; the upper wheel 28 is mounted in a yoke 31 supported on hydraulic pistons 32 supported by an upper structural member 33 of the car 10.

FIGURE 2 illustrates a plurality of seats 34 mounted transversely of car 10 on floor 35 to provide an aisle 36 throughout the length of the car 10. A streamlined housing or boss 37 is provided on the exterior of car 10 adjacent each of the wheels 28 and 29 (see FIGURE 1).

Figure 3:
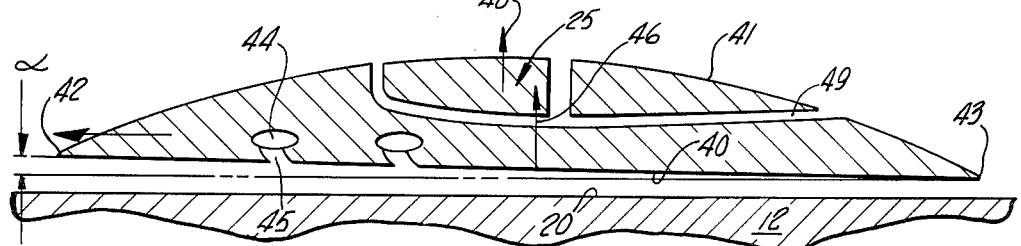
FIGURE 3 is an enlarged cross-sectional view taken along line 3—3 of FIGURE 2 and shows the vehicle-mounted fins which cooperate with the ground-mounted or stationary air-bearing surfaces.

Referring to FIGURE 3, the air-bearing principle of the support for the car 10 relative to the supports 11 and 12 and the apparatus associated with the air-bearings is illustrated. The fin 25 has a flat under surface 40, a curved upper surface 41 dictated by structural rather than by aerodynamic factors, a leading edge 42, and a trailing edge 43. The fin under surface 40 has a greater clearance from the surface 20 at the leading edge 42 than at the trailing edge 43. As the fin 25 moves forward relative to the support 12 a wedge-shaped film of ambient or atmospheric air is entrapped or entrained between the fin surface 40 and the support surface 20. This entrapped film of ambient air is the actual support for the fin 25 relative to the fixed surface 20 in much the same way that the film of oil in a journal bearing supports a rotating shaft relative to the peripheral journal. The supporting force 46 provided by the trapped air is dependent upon the angle of attack α (FIG. 3) and upon the length between the leading 42 and trailing 43 edges (chord) of the fin 25 and upon the physical properties of the air. For any given speed and weight of the vehicle 10, a predetermined amount of bearing surfaces 40 for each vehicle 10 is required.

In order to minimize the area of the surfaces 40 required to support the vehicle 10, compressed air may be introduced between surfaces 20 and 40 through ducts 44 within fin 25 and through vents 45 in the underside 40 of fin 25. When a jet engine is utilized for the propulsion means 16 of the car 10, the compressed air may be obtained from the compressor of the jet engine.

It should be pointed out that the mechanism for the support of the vehicle 10, when it is moving at relatively high speeds, is dependent upon the formation of the wedge-shaped air film between the fin 25 and the fixed support 12 and not upon any aerodynamic lift forces; in fact, lift is discouraged. The air in the wedge-shaped air pocket between each fin and the adjacent support exerts a force perpendicular to the fin 25 as the vehicle moves relative to the supports, the resultant of which force is illustrated by vector 46. The summation of these forces 46 along the length of the fin 25 produces a bending moment tending to move the fin 25 away from the support 12. The curved upper surface 41 of the fin 25 produces an aerodynamic lift force in the same direction as the air-bearing force 46; this lift force is illustrated by vector 48. The presence of the bearing force 46 is required for support of the car 10 away from the fixed ground support 12, but the lift force 48 merely increases the bending moment or load on the fin 25. An anti-lift passage 49 having communication between the upper fin surface 41 adjacent the trailing edge 43 and the upper surface 41 centrally of the fin 25 is provided to spoil the lift in order to reduce the bending moment exerted on fin 25 so that the structural requirements of the fin 25 may be reduced. The profile of the reduced pressure gradient across the surface 41 has a peak (indicating maximum reduction of the pressure of the air moving past surface 41, compared to the pressure of stationary or ambient air, as indicated by Bernoulli's theorem of fluid mechanics) adjacent the forward opening of duct 49 for a substantially zero angle of attack of the fin, as shown. The pressure at the rear opening of duct 49 of the air moving over fin surface 41 is more nearly that of the ambient air pressure. The presence of duct 49 increases the air pressure on the surface of the fin in the vicinity of the forward opening of the duct by bleeding higher pressure air into the low pressure region to degrade the peak in the negative pressure gradient. In this manner the lift manifested across the fin is reduced. Since the fins have a fixed angle of attack relative to ambient air, which angle of attack is very low as shown in FIG. 3, and since no fluid flow separation normally exists toward the rear of the fins in such cases, the duct is effective to spoil lift on the fin. It is highly desirable that the total weight of the car 10 be kept to a minimum so that the payload of the vehicle 10 can be as large as possible for any given bearing support area 40.

In the configuration of the system illustrated in FIGURE 2, the bottom or lower fins 24 and 25 provide support for the car 10 from the lower or ground-based stationary support surface 12. The upper car-mounted fins 22 and 23 provide for stabilization of the car 10 should the interior weight of the car not be centrally distributed. The upper fins also function to counteract centrifugal forces when the car 10 is in a turn. If it is assumed that the car 10 illustrated in FIGURE 2 tends to move to the right as the car 10 enters a turn, the air gaps between fin 22 and support surface 17 and between fin 24 and support surface 19 decrease to increase the force provided between these surfaces by the wedge-shaped film of air. This increased force tends to counteract the movement of the car 10 and provides a stabilizing effect.

The wheels 28 and 29 engaged in recesses 26 and 27 of the supports 11 and 12, respectively, are provided for support of the vehicle 10 at stand-still or low speeds. As the car 10 attains normal operating speed and the air-bearing forces 46 become of a magnitude such that the car can be supported wholly on the air films, the wheel 28 is retracted into the housing 37 by activation of the hydraulic cylinders 32 supporting the yoke 31. The presence of the air film between fins 24 and 25 and fixed surfaces 19 and 20, respectively, raises the car 10 such that the lower and fixed wheel 29 no longer maintains contact with the support 12. The result is that at normal operating speeds there is no mechanical contact between the car 10 and the supports 11 and 12 and support of the car 10 is solely by means of the air films between the fins 21 and the fixed supports 11 and 12.

Figure 5:
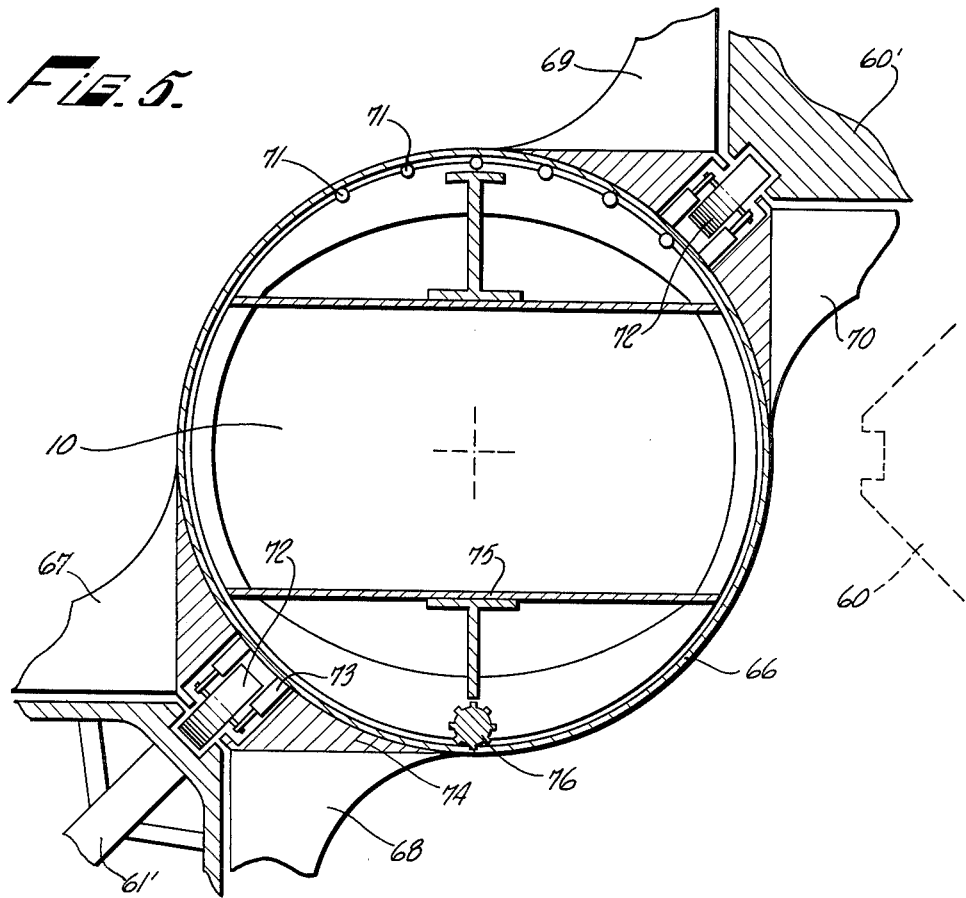
FIGURE 5 is an enlarged cross-section of the vehicle and air-bearing support surfaces of the second embodiment showing the peripheral fin-mounting bands movable relative to the vehicle body.
Figure 4:
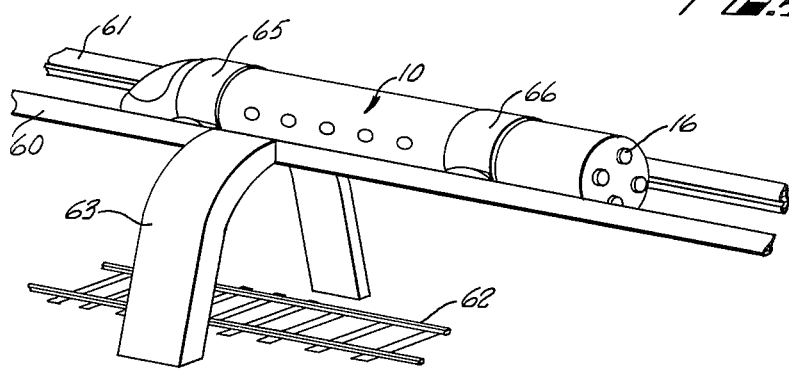
FIGURE 4 is a perspective view of a second embodiment of this invention showing the transportation system installed above a railroad right-of-way.

Referring to FIGURES 4 and 5, a second embodiment of this invention is illustrated wherein the supports 60 and 61 are disposed parallel to one another in a horizontal plane above a railroad track 62 and are supported by the arches 63; the car 10 rides between the fixed bearing surfaces of supports 60 and 61. A pair of peripheral bands or rings 65 and 66 are provided on the car 10 and the fins 67 through 70 are mounted to the peripheral band 66. FIGURE 5 illustrates that the band 66 is supported around the periphery of car 10 by bearings 71. A pair of wheels 72 is mounted diametrically opposite each other on hydraulic pistons 73 within fin-supporting structures 74 mounted to the band 66. The stationary supports 60 and 61 may be oriented vertically with relation to one another at a station of the system and then translate into the horizontal position illustrated in FIGURE 4 for cross-country travel when the car 10 of the transportation system of this invention is provided with the peripheral bands 65 and 66. As the supports 60 and 61 translate from vertical to horizontal alignment, the bands 65 and 66 move relative to the body of car 10 so that the floor 75 of the car is generally horizontal. The car 10 may have its center of gravity such that the floor 75 will automatically seek a level position, or a servo-mechanism may be provided in conjunction with a gear 76 engageable between the car 10 and the band 66 to assure that the floor 75 is maintained horizontal. A gyro mechanism (not shown) may be provided to actuate gear 76 such that the car is tilted in a turn so that passengers are not thrown sideways in their seats. (In FIGURE 5 the stationary supports are shown in a position intermediate the standstill vertical orientation and the high-speed horizontal orientation and are designated as 60' and 61'.)

Figure 6:
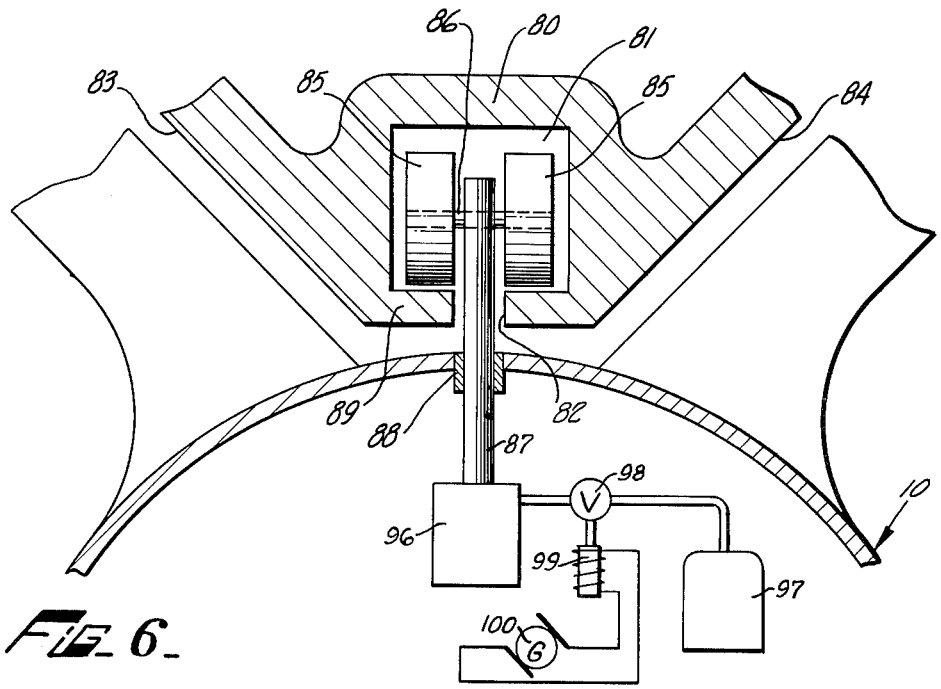
FIGURE 6 is an enlarged fragmentary cross-sectional view of the stationary air-bearing surfaces illustrating an alternate embodiment of the low-speed mechanical support of the vehicle.

FIGURE 6 illustrates an alternate method of providing positive mechanical contact between the car 10 and a stationary support 80. An internal channel 81 is provided with a lonigtudinal slot opening 82 to the exterior of the support 80 adjacent the converging fixed air-bearing support surfaces 83 and 84. A pair of low-speed and standstill wheels 85 are mounted on an axle 86 included within the free or unsupported end of a reciprocable piston 87 mounted to the car 10 through a journal bearing 88. When the car 10 is standing still or is moving at low speeds or when there is no air film support of the car 10, the shaft 87 is retracted and car 10 is supported by wheels 85 engaging flanges 89 adjacent the longitudinal slot 82 communicating with the interior recess 81. When the car 10 is up to speed and the air-film support mechanism is operating the shaft 87 is extended so that the wheels 85 ride free in the recess 81; in this situation there is no mechanical contact between the wheels 85 and the stationary support 80. The advantage of this means of support of the car 10 is that a positive interlock is always provided. If a power failure in the car 10 is experienced or an emergency arises whereby the car 10 is required to stop rapidly, the shafts 87 will automatically retract to engage wheels 85 for positively supporting the car 10 to prevent contact between air-bearing surfaces. An exemplary means for retracting shaft 87 in the event of power failure in the car is shown in FIG. 6, as including a pneumatic ram assembly 96 connected to the shaft interiorly of the car. The ram assembly is connected to a compressed air accumulator chamber 97 by means of a duct which includes a normally closed valve 98 actuated by a normally energized solenoid 99. The solenoid is connected to a power source 100 for the car. When a power failure occurs, the solenoid is de-energized to connect the accumulator to the ram assembly. The ram assembly then functions to draw shaft 87 into the vehicle so that wheels 85 are engaged with flanges 89 of the supports.

If the nature of the service of the transport system of this invention is such that the various operating speeds are envisioned or, more commonly, if it is anticipated that varying loads may be carried by the car 10, telescoping fins 90 may be provided in lieu of fins having fixed dimensions. Inclusion of telescoping fins 90 on the car 10 provides for variation in the area of the air-bearing surfaces to accommodate varying forward speeds of the car and varying payloads of the car such that sufficient air-bearing surface is always provided for maintenance of the air-bearing suspension means (see FIGURE 7).

Figure 8:
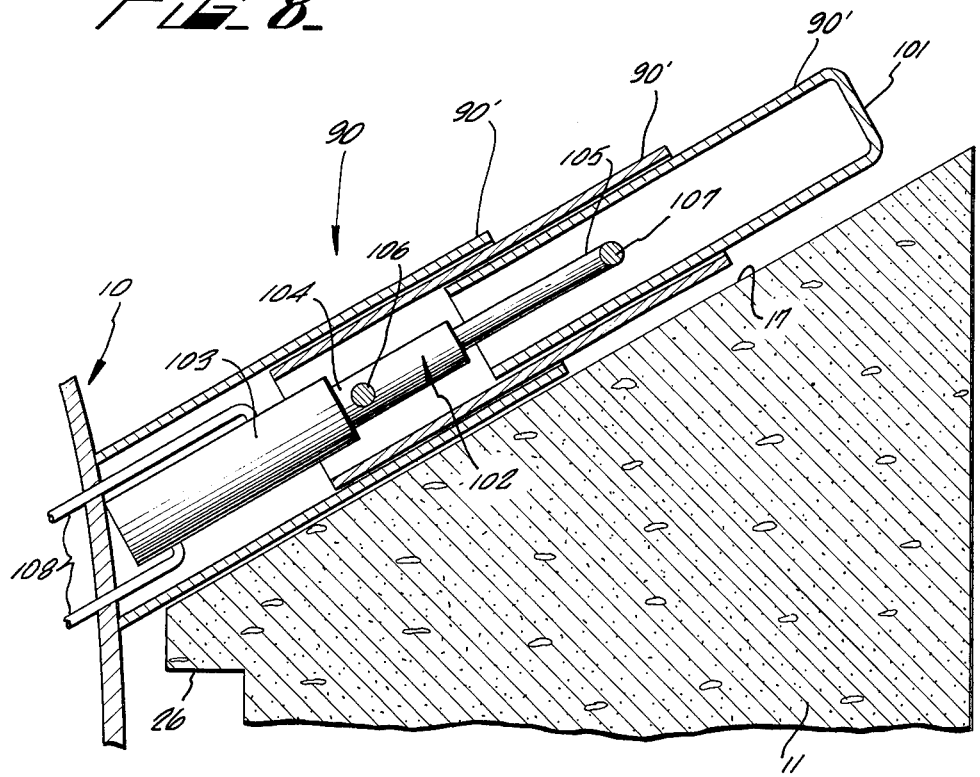
FIGURE 8 is a cross-sectional elevation of the actuating means for a telescoping fin illustrated in FIG. 7.

FIGURE 8 shows an exemplary mechanism for extending extensible fins 90. The extensible fins are comprised of a plurality of hollow telescoping sections 90' having an over-all cross-sectional profile as shown in FIG. 3. The outermost telescoping section has a closed end 101. A multistage hydraulic or pneumatic ram assembly 102 is disposed within the telescopic sections. The ram assembly has a base cylinder 103 secured to vehicle 10 and disposed in the innermost fin section which is also secured to the vehicle. Secondary and tertiary ram parts 104 and 105, respectively, cooperate with one another and with the base cylinder within the intermediate and outermost fin sections, respectively. Ram part 104 is pinned to the intermediate fin section by a connecting member 106, while ram part 105 is connected to the outermost fin section by a connecting member 107. The ram assembly is connected by ducts 108 to a source of compressed air or hydraulic fluid (not shown). Selective extension of the ram assembly results in corresponding selective extension of extensible telescoping fin 90. Only one fin assembly is illustrated in FIG. 8 since the remaining telescoping fins of the vehicle are similarly actuated.

Figure 7:
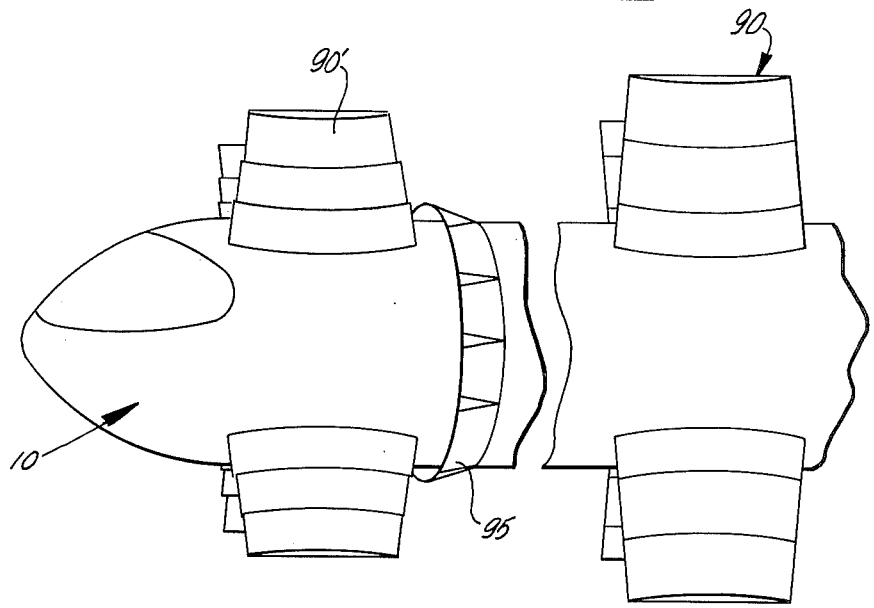
FIGURE 7 is a fore-shortened perspective view of a third embodiment of this invention illustrating telescopic fins on the vehicle body to adjust for varying load and speed conditions and also illustrating braking scoops mounted peripherally of the vehicle body.

Also, the invention includes providing the car 10 with peripheral retractable scoops 95 for braking or halting the forward motion of the car 10 (FIG. 7).

From the foregoing description of this invention, it is apparent that the vehicle 10 is not supported by aerodynamic lift on the fins of the vehicle, but rather is supported by means of an air lubrication means existing between the fins and the flat surfaces of the stationary supporting rails or guide surfaces. It has also been shown that a transport vehicle according to the system of this invention provides a smooth and quiet ride because there is no mechanical contact between the vehicle and the surrounding environment when the vehicle is operating at high speed. The configuration of the fins relative to the stationary guide and air-bearing support surfaces provides for self-stabilization of the vehicle in turns and, to some extent, is self-compensating for variations in weight of the car; the inclusion of the telescoping fins 90 extends this self-compensating range of the system.

While the invention has been described above in conjunction with specific apparatus, it is to be understood that this is by way of illustration only and not as a limitation to the scope of this invention.

I claim:

1. A transportation system comprising a vehicle including means for propelling the vehicle, guidance means forming at least a pair of stationary air-bearing surfaces disposed longitudinally along the path of the vehicle, and a plurality of air-bearing vehicle support members affixed to the vehicle, the support members having surfaces positioned in spaced apart cooperating relationship with the fixed support surfaces, wherein the vehicle is supported on wedge-shaped films of ambient air compressed between the surfaces of the stationary guidance means and vehicle-mounted support members as the vehicle moves relative to the guidance means.

2. A transportation system according to claim 1 wherein there are two stationary guidance means disposed above and below the vehicle, each guidance means having a pair of spaced apart converging air-bearing surfaces.

3. A transportation system according to claim 2 wherein the support members are variable in length at right angles to the direction of travel of the vehicle for variation of the compressed air support of the vehicle 4. A transportation system according to claim 2 wherein the stationary surfaces of the guidance members are included in a ground mounted structure, are exposed to the atmosphere, and are disposed in a substantially horizontal plane on opposite sides of the vehicle.

5. A transportation system according to claim 4 including a plurality of peripheral bands around the vehicle and at least two support members mounted to each band, each band being peripherally movable relative to the vehicle.

6. A transportation system comprising a vehicle including reaction propulsion means for the vehicle, stationary guidance means defining two pairs of stationary air-bearing surfaces arranged one pair above and one pair below and parallel to the vehicle, and a plurality of fins extending from the vehicle including vehicle-mounted air-bearing surfaces substantially parallel to the stationary surfaces, said guidance means further defining longitudinal grooves between said surfaces, a plurality of wheels mounted to the vehicle enagageable in the grooves, and means for disengaging some of the wheels from the grooves when the vehicle is moving, whereby the vehicle is supported on wedge-shaped films of air entrapped between the stationary and vehicle-mounted air-bearing surfaces.

7. A transportation system comprising a vehicle including means for propelling the vehicle, a pair of spaced apart parallel guidance means, each guidance means defining a stationary air-bearing surface, the vehicle being disposed between the guidance means, a plurality of vehicle support members affixed to the vehicle in cooperating relationship with the stationary surfaces, each support member having a forward edge and a rearward edge, the distance between each forward edge and the cooperating stationary surface being greater than the distance between the associated rear edge and the cooperating stationary surface, whereby forward motion of the vehicle relative to the stationary surfaces entraps air between each support member and its cooperating stationary surface to form a region of compressed air supporting the vehicle.

8. A transportation system according to claim 7 including a second surface on each guidance means, a plurality of wheels mounted to the vehicle and engageable with the second surfaces, and means in the vehicle for disengaging some of the wheels from the second surfaces as the vehicle is supported on the region of compressed air.

9. A transportation system according to claim 7 wherein the stationary air-bearing surfaces are planar, and the vehicle support members comprise fins extending outwardly from the vehicle, each fin defining a substantially planar surface cooperating with the planar stationary surfaces.

10. A transportation system according to claim 9 including extension means for each fin operable to increase the substantially planar surface of the fin, and means in the vehicle for operating the fin surface extension means.

11. A transportation system according to claim 9 wherein each fin defines a second surface opposite from the planar surface, the second surface having a convex curvature, and duct means in the fin communicating between an exterior forward portion of the fin second surface and an exterior rearward portion of the fin second surface for spoiling aerodynamic lift of the second surface when the vehicle moves relative to the guidance means.

12. A transportation system according to claim 1 wherein the vehicle support members are disposed substantially parallel to the direction of travel of the vehicle, the distance between the forward edge of each support member and the cooperating guidance means being greater than the distance between the rearward edge of each support member and the guidance means, whereby forward motion of the vehicle relative to the guidance means entraps ambient air between each support member and its cooperating guidance means to form a region of compressed air supporting the vehicle.

13. A transportation system according to claim 12 including means for introducing compressed air into the spaces between the support members and the guidance means stationary surfaces to augment the entrapped compressed air support mechanism of the vehicle.

14. A transportation system according to claim 12 wherein the spacing between each support member surface and its cooperating guidance means stationary surface varies linearly from the forward to the rearward edge of the support member along a line parallel to the direction of travel of the vehicle.

15. A transportation system comprising a vehicle including means for propelling the vehicle, two stationary guidance means disposed above and below the vehicle, each guidance means having a pair of converging air-bearing surfaces, each guidance means having a longitudinal groove disposed between the pair of converging stationary surfaces and opening toward the vehicle, a plurality of wheels mounted to the vehicle engageable in the grooves for supporting the vehicle when at rest and when moving at a speed less than a predetermined velocity, and a plurality of air-bearing vehicle support members affixed to the vehicle, the support members having forward and rear edges and surfaces positioned in cooperating relationship with the stationary surfaces, the surfaces of the support members being spaced further from the cooperating stationary surfaces adjacent their forward edges than adjacent their rear edges, whereby the vehicle is supported on wedge-shaped films of air compressed between the surfaces of the stationary guidance means and vehicle-mounted support member surfaces as the vehicle moves relative to the ground after the predetermined velocity has been attained.

16. A transportation system according to claim 15 including means for disengaging from the upper groove the wheels engageable in the upper groove.

17. A transportation system comprising a vehicle including means for propelling the vehicle, a pair of ground mounted guidance members disposed on opposite sides of the vehicle, each guidance member forming at least a pair of stationary air-bearing surfaces disposed longitudinally along the path of the vehicle, at least one of the guidance members further defining a longitudinal groove opening toward the vehicle, a plurality of wheels mounted to the vehicle and engageable in the groove for supporting the vehicle when at rest and when moving at a speed below a predetermined velocity, a plurality of support members affixed to the vehicle, the support members having forward and rear edges and air-bearing surfaces positioned in cooperating relationship with the stationary support surfaces, the forward edges of the support member being spaced farther from the stationary support surfaces at their forward edges than at their rearward edges, whereby the vehicle is supported on wedge-shaped films of air compressed between the surfaces of the stationary guidance means and vehicle mounted support member surfaces as the vehicle moves relative to the ground after the vehicle has attained the predetermined velocity.

18. A transportation system according to claim 5 including means connected between the vehicle and the peripheral bands operable to provide relative angular displacement between the vehicle and the bands.

19. A transportation system according to claim 15 wherein the groove in the upper guidance means has laterally spaced apart lower edges and flange means extending transversely of the groove from at least one lower edge underlying and engaging the wheels engaged in said groove for positive interlocking between the vehicle and the guidance member when the vehicle is at rest and when it moves at a speed below the predetermined velocity.

References Cited by the Examiner

UNITED STATES PATENTS

| | | | |
|---|---|---|---|
| 1,274,037 | 7/1918 | Hasbrouck | 244—113 |
| 1,949,691 | 3/1934 | Neher et al. | 104—94 X |
| 2,038,337 | 4/1936 | Ballmann | 244—43 |
| 2,063,005 | 12/1936 | Payne. | |
| 2,219,234 | 10/1940 | Messerschmitt. | |
| 2,511,979 | 6/1950 | Goddard | 104—138 |
| 2,859,711 | 11/1958 | Track | 105—453 |
| 2,969,751 | 1/1961 | Toulmin | 104—23 |

ARTHUR L. LA POINT, *Primary Examiner.*

JAMES S. SHANK, LEO QUACKENBUSH, *Examiners.*